United States Patent
Bai et al.

(10) Patent No.: US 9,964,809 B2
(45) Date of Patent: May 8, 2018

(54) HIGH TRANSMITTANCE VA TYPE LIQUID CRYSTAL DISPLAY PANEL AND MANUFACTURE METHOD THEREOF

(71) Applicant: Shenzhen China Star Optoelectronics Technology Co., Ltd., Shenzhen (CN)

(72) Inventors: Bai Bai, Shenzhen (CN); Yungjui Lee, Shenzhen (CN); Xinhui Zhong, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 143 days.

(21) Appl. No.: 14/762,470

(22) PCT Filed: Apr. 22, 2015

(86) PCT No.: PCT/CN2015/077148
§ 371 (c)(1),
(2) Date: Jul. 22, 2015

(87) PCT Pub. No.: WO2016/149974
PCT Pub. Date: Sep. 29, 2016

(65) Prior Publication Data
US 2017/0045781 A1    Feb. 16, 2017

(30) Foreign Application Priority Data

Mar. 24, 2015  (CN) .......................... 2015 1 0130791

(51) Int. Cl.
*G02F 1/1333*  (2006.01)
*G02F 1/1337*  (2006.01)
(Continued)

(52) U.S. Cl.
CPC ...... *G02F 1/133707* (2013.01); *G02F 1/1337* (2013.01); *G02F 1/1341* (2013.01);
(Continued)

(58) Field of Classification Search
CPC ........ G02F 2001/133742; G02F 2001/133773; G02F 1/1333; G02F 1/13;
(Continued)

(56) References Cited

U.S. PATENT DOCUMENTS

| 2003/0147027 A1* | 8/2003 | Wachi .............. G02F 1/133514 349/106 |
| 2007/0202253 A1* | 8/2007 | Ong .................... C23C 16/0209 427/248.1 |
| 2009/0002612 A1* | 1/2009 | Tamaki ............. G02F 1/133753 349/117 |

FOREIGN PATENT DOCUMENTS

| CN | 102402042 A | 4/2012 |
| TW | 201407247 A | 2/2014 |

* cited by examiner

*Primary Examiner* — Thoi Duong
(74) *Attorney, Agent, or Firm* — Leong C. Lei

(57) ABSTRACT

The present invention provides a high transmittance VA type liquid crystal display panel and a manufacture method thereof. The lower substrate (1) of the high transmittance VA type liquid crystal display panel comprises a first bump layer (12), and the upper substrate (2) comprises a second bump layer (22); the first bump layer (12) comprises a first convex part (121) and a first concave part (122) which are mutually spaced; the pixel electrode (13) continuously covers the first convex part (121) and first concave part (122) with a uniform thickness; the second bump layer (22) and the first bump layer (12) complement in structure, and the second bump layer (22) comprises a second convex part (221) and a second concave part (222) which are mutually spaced, and the common electrode (23) continuously covers the second convex part (221) and the second concave part (222) with a uniform thickness; the second convex part (221) is in accordance with the first concave part (122), and the second concave part (222) is in accordance with the first convex part (121).

14 Claims, 7 Drawing Sheets

(51) Int. Cl.
*G02F 1/1341* (2006.01)
*G02F 1/1343* (2006.01)
*G02F 1/1362* (2006.01)

(52) U.S. Cl.
CPC .... *G02F 1/13439* (2013.01); *G02F 1/133723* (2013.01); *G02F 2001/133302* (2013.01); *G02F 2001/136231* (2013.01); *G02F 2201/121* (2013.01); *G02F 2201/123* (2013.01); *G02F 2203/01* (2013.01)

(58) Field of Classification Search
CPC ......... G02F 1/133711; G02F 1/133345; G02F 1/1337; G02F 1/133707; G02F 1/133723; G02F 1/133305; G02F 1/13378; G02F 1/155; G02F 2202/022; H01L 27/1259; H01L 27/1262; H01L 27/3258; H01L 2251/308; G09G 2300/0426; G09G 2300/0447; G09G 2320/068; Y10T 428/1005; Y10T 428/1023
USPC ......... 349/42, 123, 130, 138, 187, 139, 129, 349/158
See application file for complete search history.

HIGH TRANSMITTANCE VA TYPE LIQUID CRYSTAL DISPLAY PANEL AND MANUFACTURE METHOD THEREOF

FIELD OF THE INVENTION

The present invention relates to a display technology field, and more particularly to a high transmittance VA type liquid crystal display panel and a manufacture method thereof.

BACKGROUND OF THE INVENTION

The Liquid Crystal Display (LCD) possesses advantages of thin body, power saving and no radiation to be widely used in many application scope. Such as LCD TV, mobile phone, personal digital assistant (PDA), digital camera, notebook, laptop, and dominates the flat panel display field.

In recent years, the Thin Film Transistor-LCD (TFT-LCD) has been rapidly developed and applied widely. For the TFT-LCD in the mainstream market, three types, which respectively are Twisted Nematic (TN), Super Twisted Nematic (STN), In-Plane Switching (IPS) and Vertical Alignment (VA) can be illustrated. The VA liquid crystal display possesses extremely high contrast than the liquid crystal displays of other types, which can reach up to 4000-8000 in general. It has very wide application in large scale display, such as television or etc.

The reason why the VA liquid crystal display possesses extremely high contrast is that the liquid crystal molecules are vertically aligned to the substrate surface, and no phase difference exists, and light leakage is very small, and the dark state brightness is extremely small at the dark state without applying electricity. The lower the brightness at the dark state can be, the higher the contrast is according to the contrast calculation formula. For vertically aligning the liquid crystal molecules of the VA liquid crystal display to the substrate surface, it is demanded to implement vertical alignment treatment to the liquid crystal molecules. The most common way is to coat vertical alignment solution (Polyimide, PI solution) on specific areas of surfaces of the upper substrate and the lower substrate, and then to bake the substrates for a long period in certain temperature for curing the solvent in the alignment solution. Thus, PI alignment layers are formed on the surfaces of the glass substrates. As shown in FIG. 1, the traditional VA liquid crystal display comprises an upper glass substrate 10, a lower glass substrate 20 oppositely located to the upper glass substrate 10, a liquid crystal layer 40 sandwiched between the upper glass substrate 10 and the lower glass substrate 20, PI alignment layers 30 formed on a surface of the upper glass substrate 10 facing downward to the glass substrate 20 and a surface of the lower glass substrate 20 facing upward to the upper glass substrate 10. However, because the VA liquid crystal display utilizes vertical twist liquid crystals and the birefraction difference of the liquid crystal molecules is larger, the issue of the color shift under large view angle is more serious.

For earning better wide view angle property for the VA liquid crystal display panel to improve the color shift issue, the multi-domain VA (MVA) technology is commonly utilized, which is to divide a sub pixel into many districts and drive the liquid crystals in respective districts to lie down toward different directions as applying voltage. Thus, the watch results from respective directions can be equal. There are many ways to achieve MVA technology. Please refer to FIG. 2 and FIG. 3. One of these ways is to process the ITO pixel electrode 70 at one side to be a pozidriv slit pattern, and the common electrode 80 is a plane electrode. With the special ITO pixel electrode pattern, the tilt electric field can induce the liquid crystal molecules 40 in different areas to lie down toward different directions. FIG. 2 is a top view diagram of one side of a lower substrate 20 in an MVA type liquid crystal display panel. 210 and 220 respectively are a scan line and a data line. One sub pixel is divided into four areas. The ITO pixel electrode 70 in each area forms pixel electrode branches and a slit interval pattern extending toward different directions. FIG. 3 is a sectional diagram of an MVA type liquid crystal display panel corresponding to A-A portion shown in FIG. 2. The pixel electrode 70 having slits is formed on a flat lower passivation layer 60, and the surface of the PI alignment layer 30 covering the pixel electrode 70 is irregular. However, the plane common electrode 80 is formed on a flat upper passivation layer 90, and the surface of the PI alignment layer 30 covering the plane common electrode 80 appears to be a plane surface. Therefore, different cell gaps exist in the slit corresponding areas and the pixel electrode branch corresponding areas.

According to the transmittance formula of the VA liquid crystal display panel:

$$T = \frac{1}{2}\sin^2 2\Delta\phi \sin^2 \frac{\Gamma}{2} \quad (1)$$

wherein T is transmittance, and $\Delta\phi$ is the included angle between the long axis of the liquid crystal and the polarizer, of which the efficiency is the maximum as the angle is 45°; $\Gamma$ is the phase difference, and the calculation formula is $2\pi*\Delta n*d/\lambda$, and d is the cell gap, and $\Delta n$ is the refractivity difference of the long, short axes of the liquid crystal; as known according to formula (1), as $\Gamma$ is $\pi$, the transmittance is the maximum, i.e. as $d=\lambda/(2*\Delta n)$, the transmittance is the maximum. Too large or too small cell gap can cause the reduction of the transmittance.

As shown in FIG. 3, the transmittance of the pixel electrode branch corresponding area is designed to be the maximum in general, and the cell gap D' of the slit corresponding area is different from the cell gap D of the pixel electrode branch corresponding area and the transmittance of the liquid crystal display panel will decrease, accordingly; besides, no ITO pixel electrode exists in the slit corresponding area, and in comparison with the pixel electrode branch corresponding area, the electrical field of the slit corresponding area is weaker, and the tilt degree of the liquid crystal is smaller. Thus, the transmittance of the slit corresponding area drops. Ultimately, the display brightness of the slit corresponding area is darker to result in nonuniform display brightness of the liquid crystal display panel.

SUMMARY OF THE INVENTION

An objective of the present invention is to provide a high transmittance VA type liquid crystal display panel which can solve issue of decreased transmittance due to the pixel electrode pattern to raise the transmittance of the VA type liquid crystal display panel, and the demand of the VA type liquid crystal display panel to the backlight brightness can be decreased to reduce the cost and usage power consumption.

Another objective of the present invention is to provide a manufacture method of a high transmittance VA type liquid crystal display panel, of which the transmittance of the VA type liquid crystal display panel made by the method is high and the demand of the VA type liquid crystal display panel to the backlight brightness can be decreased to reduce the cost and usage power consumption.

For realizing the aforesaid objectives, the present invention first provides a high transmittance VA type liquid crystal display panel, comprising a lower substrate, an upper substrate oppositely located to the lower substrate and a liquid crystal layer located between the upper substrate and the lower substrate;

the lower substrate comprises a lower glass substrate, a first bump layer, a pixel electrode and a first PI alignment layer from bottom to top in sequence; the upper substrate comprises an upper glass substrate, a second bump layer, a common electrode and a second PI alignment layer from top to bottom in sequence;

the first bump layer comprises a first convex part and a first concave part which are mutually spaced, and the pixel electrode continuously covers the first convex part and first concave part with a uniform thickness; the second bump layer and the first bump layer complement in structure, and the second bump layer comprises a second convex part and a second concave part which are mutually spaced, and the common electrode continuously covers the second convex part and the second concave part with a uniform thickness; the second convex part is in accordance with the first concave part, and the second concave part is in accordance with the first convex part.

Heights of the first convex part and the second concave part are equal, and heights of the first concave part and the second convex part are equal.

The first concave part is coherent with an upper surface of the lower glass substrate, and the second convex part is coherent with a lower surface of the upper glass substrate.

One of the first bump layer and the second bump layer is made by utilizing positive transparent photoresist material, and the other is made by utilizing negative transparent photoresist material.

The first bump layer and the second bump layer are made with the same mask.

Both materials of the pixel electrode and the common electrode are ITO.

The present invention further provides a high transmittance VA type liquid crystal display panel, comprising a lower substrate, an upper substrate oppositely located to the lower substrate and a liquid crystal layer located between the upper substrate and the lower substrate;

the lower substrate comprises a lower glass substrate, a first bump layer, a pixel electrode and a first PI alignment layer from bottom to top in sequence; the upper substrate comprises an upper glass substrate, a second bump layer, a common electrode and a second PI alignment layer from top to bottom in sequence;

the first bump layer comprises a first convex part and a first concave part which are mutually spaced, and the pixel electrode continuously covers the first convex part and first concave part with a uniform thickness; the second bump layer and the first bump layer complement in structure, and the second bump layer comprises a second convex part and a second concave part which are mutually spaced, and the common electrode continuously covers the second convex part and the second concave part with a uniform thickness; the second convex part is in accordance with the first concave part, and the second concave part is in accordance with the first convex part;

wherein heights of the first convex part and the second concave part are equal, and heights of the first concave part and the second convex part are equal;

wherein both materials of the pixel electrode and the common electrode are ITO.

The present invention further provides a manufacture method of a high transmittance VA type liquid crystal display panel, comprising steps of:

step 1, providing a lower glass substrate and an upper glass substrate;

step 2, respectively manufacturing a first bump layer on the lower glass substrate and a second bump layer on the upper glass substrate;

the first bump layer comprises a first convex part and a first concave part which are mutually spaced; the second bump layer and the first bump layer complement in structure, and the second bump layer comprises a second convex part and a second concave part which are mutually spaced; the second convex part is in accordance with the first concave part, and the second concave part is in accordance with the first convex part;

step 3, respectively manufacturing a pixel electrode on the first bump layer to make the pixel electrode continuously cover the first convex part and first concave part with a uniform thickness; manufacturing a common electrode on the second bump layer to make the common electrode continuously cover the second convex part and the second concave part with a uniform thickness;

step 4, respectively manufacturing a first PI alignment layer on the pixel electrode to form a lower substrate, and manufacturing a second PI alignment layer on the common electrode to form an upper substrate;

step 5, oppositely assembling the upper substrate and the lower substrate, and injecting liquid crystal between the upper substrate and the lower substrate to form a liquid crystal layer.

The step 2 specifically comprises:

step 21, coating positive transparent photoresist material or negative transparent photoresist material on the lower glass substrate, and implementing exposure, development to the positive transparent photoresist material or the negative transparent photoresist material with a mask to manufacture the first bump layer;

step 22, coating the negative transparent photoresist material or the positive transparent photoresist material, which is opposite to that of the first bump layer on the upper glass substrate, and implementing exposure, development to the corresponding negative transparent photoresist material or the corresponding positive transparent photoresist material with the same mask to manufacture the second bump layer.

In the step 2, the first concave part is coherent with an upper surface of the lower glass substrate, and the second convex part is coherent with a lower surface of the upper glass substrate.

Both materials of the pixel electrode and the common electrode are ITO.

The benefits of the present invention are: the present invention provides a VA type liquid crystal display panel. By respectively providing the first bump layer, the second bump layer, which complement in structure on the lower substrate and the upper glass substrate, and respectively providing the pixel electrode and the common electrode to continuously cover the first bump layer and the second bump layer with uniform thicknesses to realize the multi-domain display, the cell gaps of the liquid crystal layers in the different areas of the lower substrate and the upper substrate are basically consistent and the intensity of the electrical fields is basically uniform. The issue of decreased transmittance due to the slits in the pixel electrode pattern can be solved to raise the transmittance of the VA type liquid crystal display panel, and the demand of the VA type liquid crystal display panel to the backlight brightness can be decreased to reduce the cost and usage power consumption. The present invention provides a manufacture method of a high transmittance VA type liquid crystal display panel, where the same mask is utilized to manufacture the first bump layer and the second bump layer to make the first bump layer and the second bump layer complement in structure. The transmittance of the VA type liquid crystal display panel made by the method is high and the demand of the VA type liquid crystal display panel to the backlight brightness can be decreased to reduce the cost and usage power consumption.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
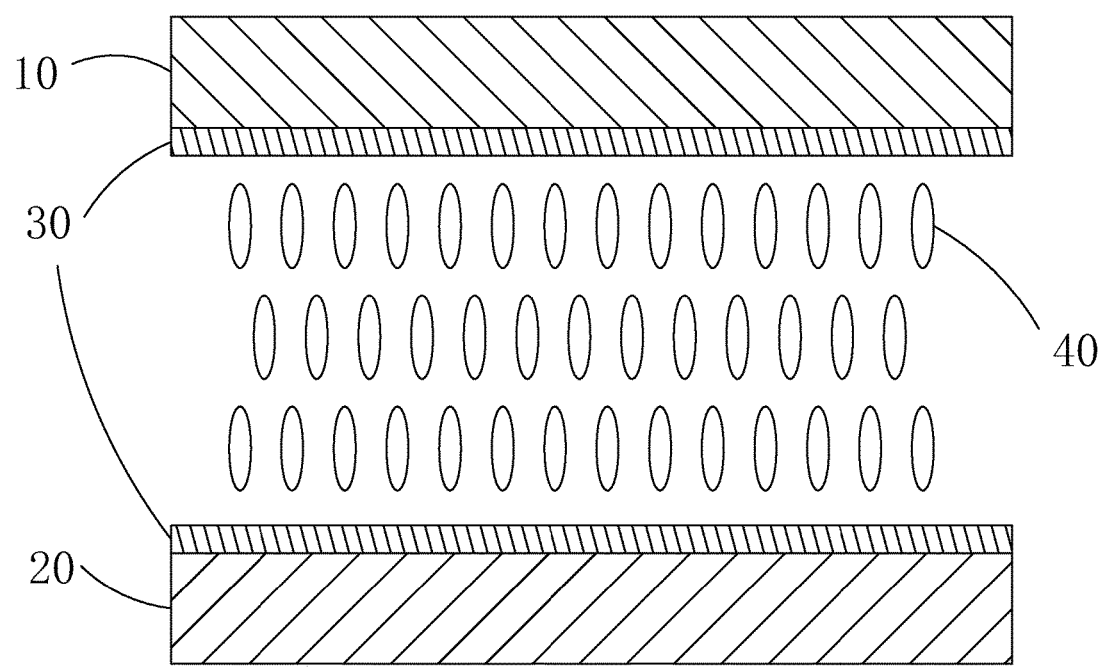
FIG. 1 is a sectional diagram of a VA type liquid crystal display panel according to prior art.
Figure 2:
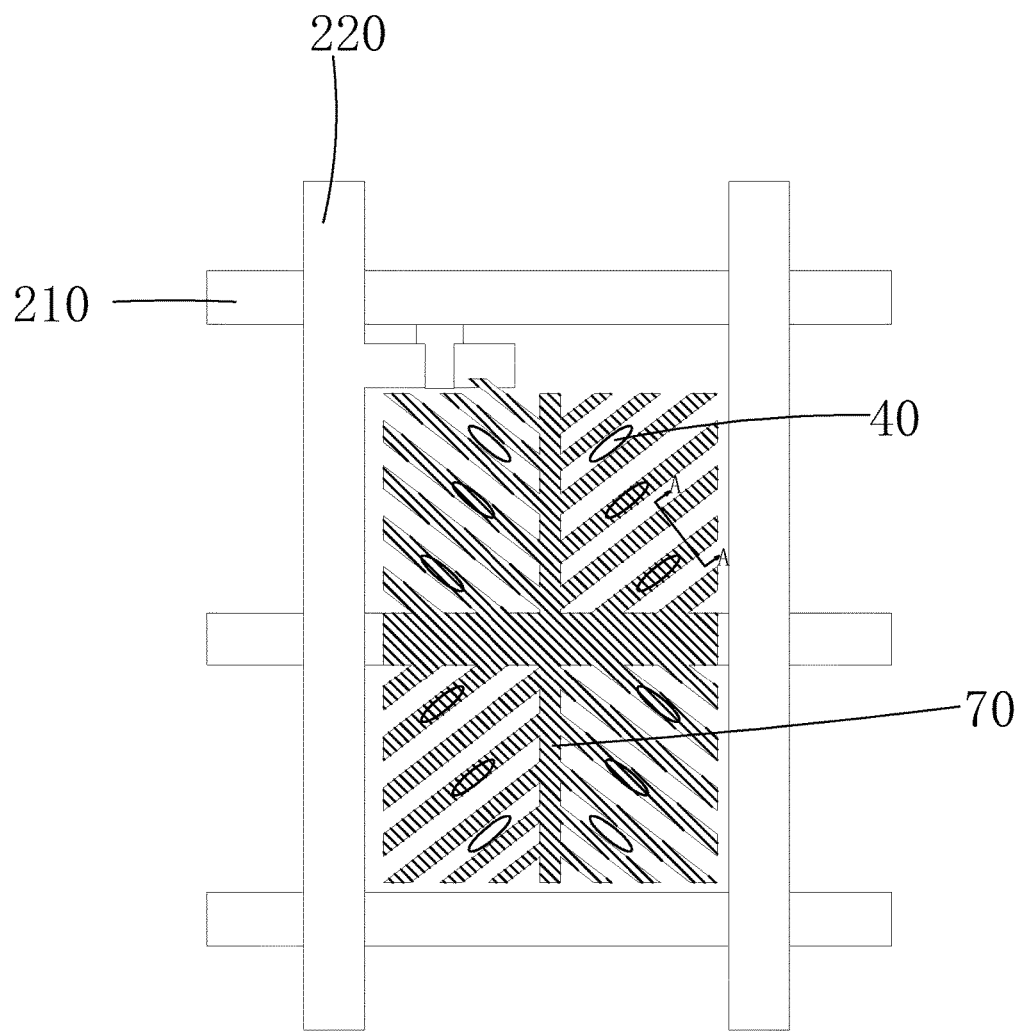
FIG. 2 is a top view diagram of one side of a lower substrate in an MVA type liquid crystal display panel according to prior art.
Figure 3:
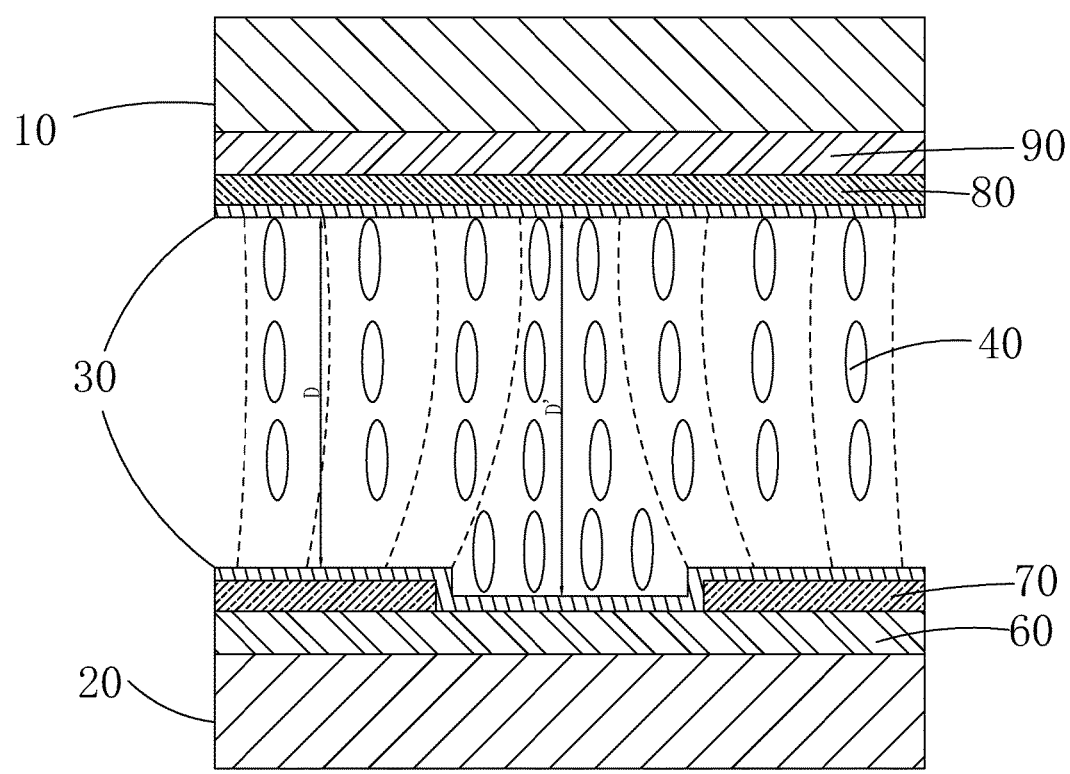
FIG. 3 is a sectional diagram of an MVA type liquid crystal display panel according to prior art corresponding to A-A portion shown in FIG. 2.
Figure 4:
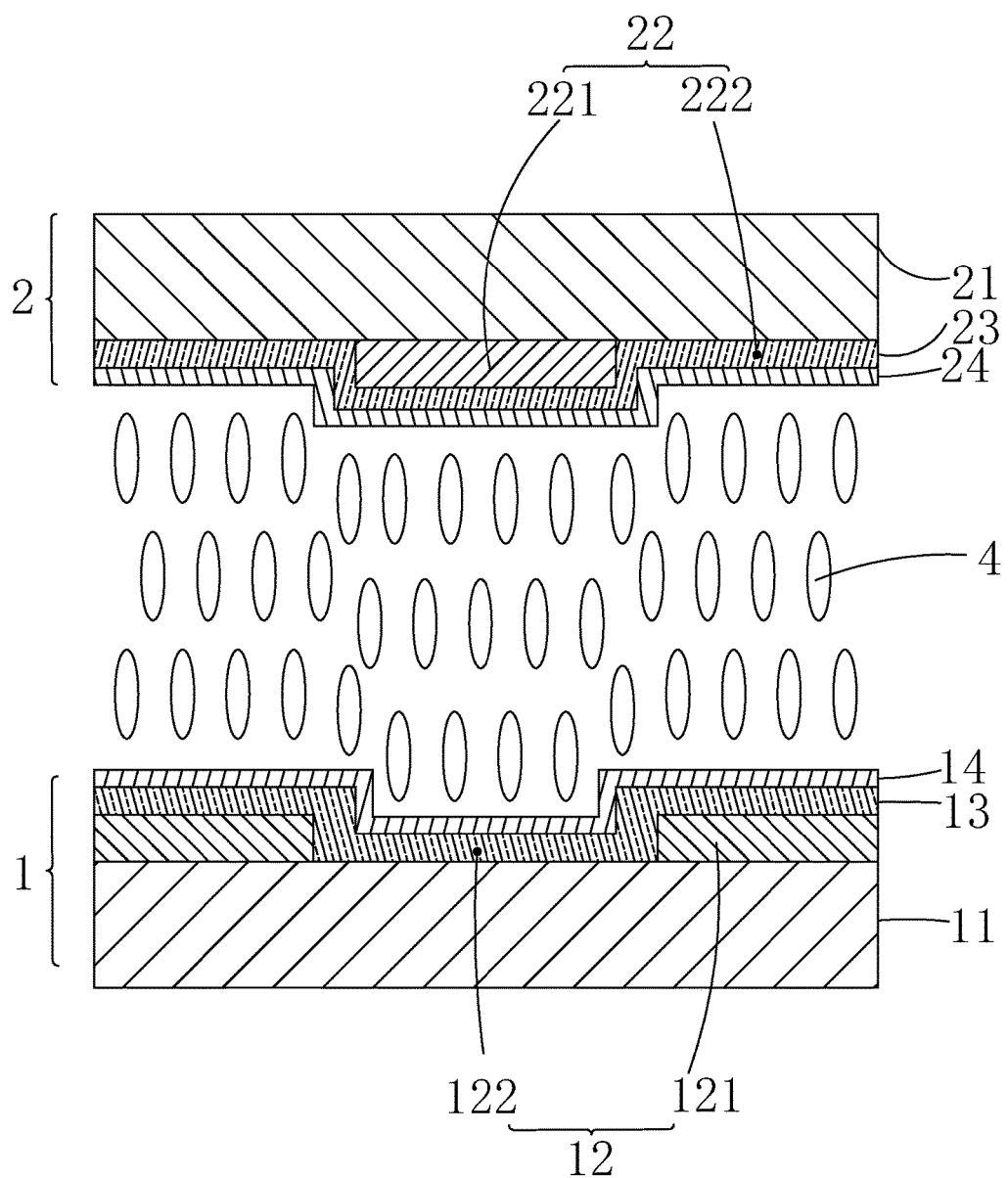
FIG. 4 is a sectional diagram of a high transmittance VA type liquid crystal display panel according to the present invention.

Please refer to FIG. 4. The present invention first provides a high transmittance VA type liquid crystal display panel, comprising a lower substrate 1, an upper substrate 2 oppositely located to the lower substrate 1 and a liquid crystal layer 4 located between the upper substrate 2 and the lower substrate 1.

The lower substrate 1 comprises a lower glass substrate 11, a first bump layer 12, a pixel electrode 13 and a first PI alignment layer 14 from bottom to top in sequence. The upper substrate 2 comprises an upper glass substrate 21, a second bump layer 22, a common electrode 23 and a second PI alignment layer 24 from top to bottom in sequence.

The first bump layer 12 comprises a first convex part 121 and a first concave part 122 which are mutually spaced, and the pixel electrode 13 continuously covers the first convex part 121 and first concave part 122 with a uniform thickness. The second bump layer 22 and the first bump layer 12 complement in structure, and the second bump layer 22 comprises a second convex part 221 and a second concave part 222 which are mutually spaced, and the common electrode 23 continuously covers the second convex part 221 and the second concave part 222 with a uniform thickness; the second convex part 221 is in accordance with the first concave part 122, and the second concave part 222 is in accordance with the first convex part 121.

Preferably, heights of the first convex part 121 and the second concave part 222 are equal, and heights of the first concave part 122 and the second convex part 221 are equal to make the gaps between the different areas of the lower substrate 1 and the upper substrate 2 be consistent and guarantee to form the tilt electrical field similarly as the prior art does. While conducting the liquid crystal molecules in different areas to tilt toward the designed directions to realize the multi-domain display, the cell gaps of the liquid crystal layers 4 in the different areas of the lower substrate 1 and the upper substrate 2 are basically consistent. Meanwhile, the pixel electrode 13 continuously covers the first convex part 121 and first concave part 122 with a uniform thickness. No electrode areas corresponded with the slits of the pixel electrode pattern in prior art exist. The intensities of the electrical fields in the different areas of the lower substrate 1 and the upper substrate 2 are basically uniform. The issue of decreased transmittance due to the slits in the pixel electrode pattern can be solved to raise the transmittance of the VA type liquid crystal display panel, and the demand of the VA type liquid crystal display panel to the backlight brightness can be decreased to reduce the cost and usage power consumption.

Significantly, the first concave part 122 is coherent with an upper surface of the lower glass substrate 11, and the second convex part 222 is coherent with a lower surface of the upper glass substrate 21 so that the first bump layer 12 and the second bump layer 22 are easy to be manufactured.

One of the first bump layer 12 and the second bump layer 22 is made by utilizing positive transparent photoresist material, and the other is made by utilizing negative transparent photoresist material. The material of the first bump layer 12 and the material of the second bump layer 22 possess opposite polarities. Therefore, merely one mask is required to manufacture the first bump layer 12 and the second bump layer 22, which complement in structure.

Both materials of the pixel electrode 13 and the common electrode 23 are Indium Tin Oxide (ITO).

Figure 5:
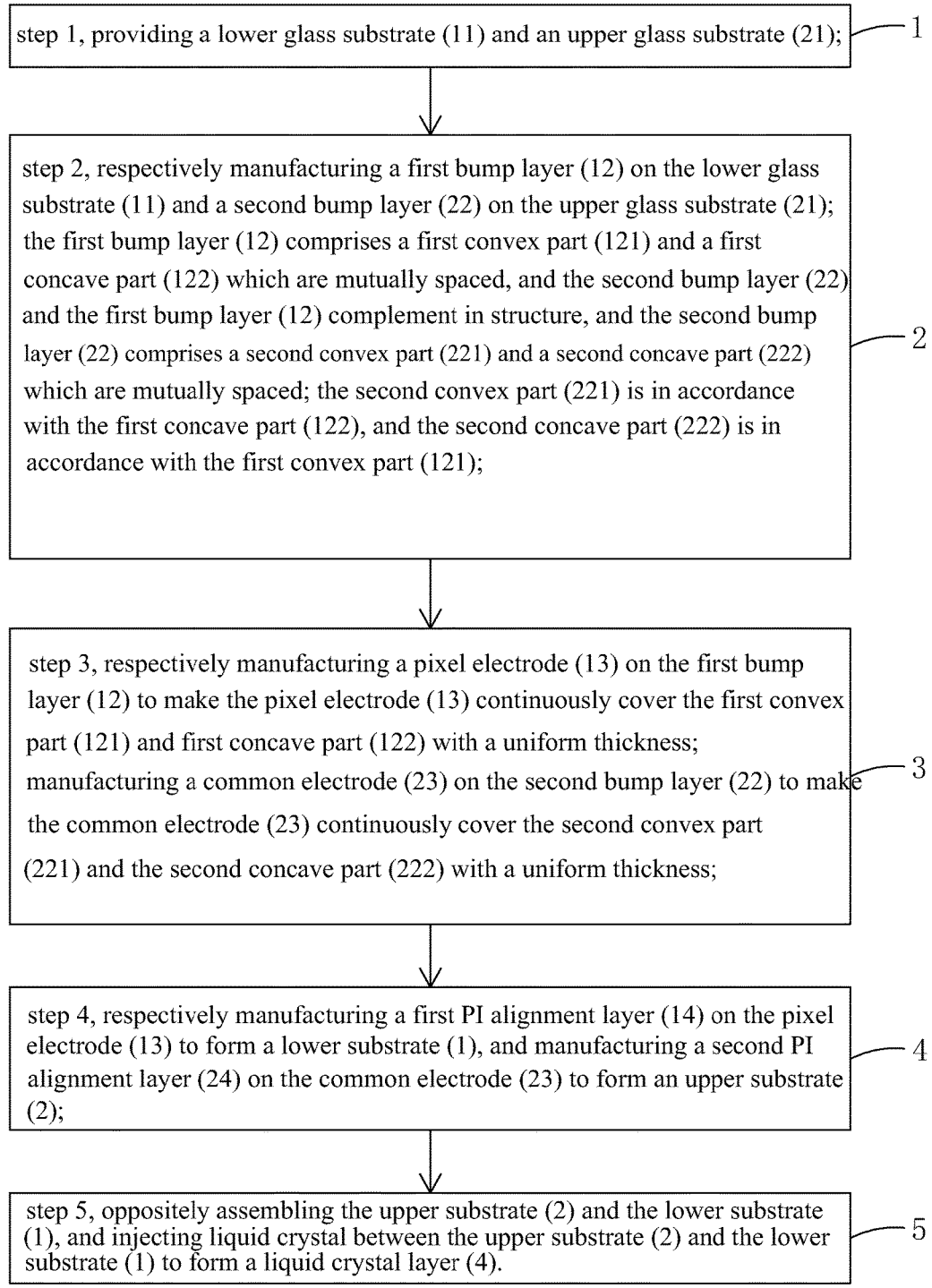
FIG. 5 is a flowchart of a manufacture method of a high transmittance VA type liquid crystal display panel according to the present invention.

Please refer to FIG. 5 with conjunction of FIG. 4. The present invention further provides a manufacture method of a TFT substrate, comprising steps of:

step 1, providing a lower glass substrate 11 and an upper glass substrate 21.

step 2, respectively manufacturing a first bump layer 12 on the lower glass substrate 11 and a second bump layer 22 on the upper glass substrate 21.

The first bump layer 12 comprises a first convex part 121 and a first concave part 122 which are mutually spaced, and the second bump layer 22 and the first bump layer 12 complement in structure, and the second bump layer 22 comprises a second convex part 221 and a second concave part 222 which are mutually spaced; the second convex part 221 is in accordance with the first concave part 122, and the second concave part 222 is in accordance with the first convex part 121.

Specifically, the step 2 comprises:

step 21, coating positive transparent photoresist material or negative transparent photoresist material on the lower glass substrate 11, and implementing exposure, development to the positive transparent photoresist material or the negative transparent photoresist material with a mask 7 to manufacture the first bump layer 12.

Figure 6A:
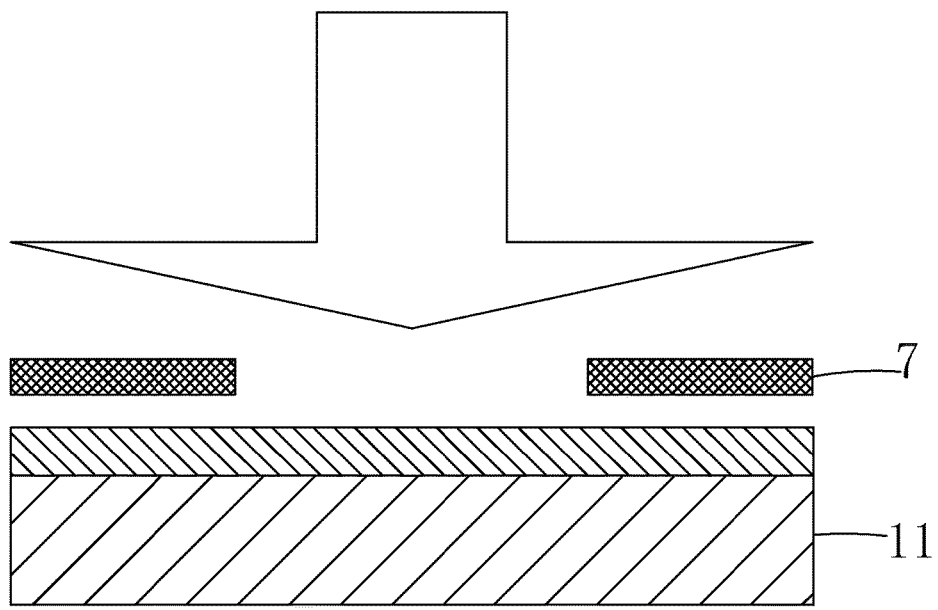
FIG. 6a is a diagram of exposure process in the step 21 of the manufacture method of the high transmittance VA type liquid crystal display panel according to the present invention.
Figure 6B:
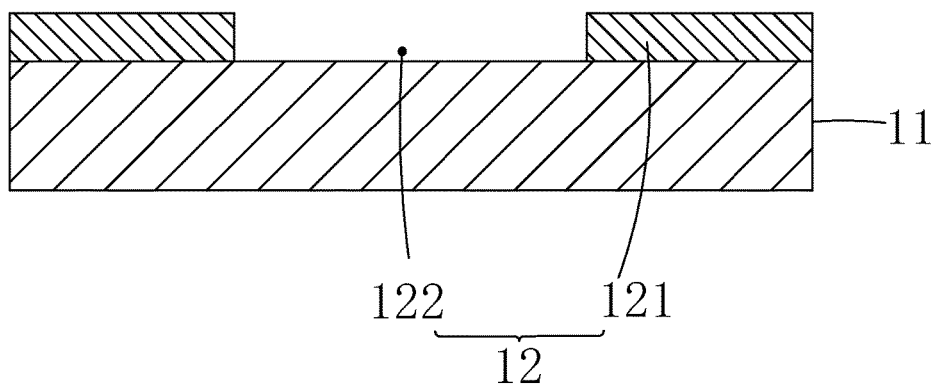
FIG. 6b is a diagram of development process in the step 21 of the manufacture method of the high transmittance VA type liquid crystal display panel according to the present invention.

Please refer to FIG. 6a and FIG. 6b. Coating the positive transparent photoresist material on the lower glass substrate 11 is illustrated. After exposure and development, the positive transparent photoresist material shielded by the mask 7 is preserved to form the first convex part 121 of the first bump layer 12; the positive transparent photoresist material not shielded by the mask 7 is removed to form the first concave part 122 of the first bump layer 12, and the first concave part 122 is coherent with an upper surface of the lower glass substrate 11.

step 22, coating the negative transparent photoresist material or the positive transparent photoresist material, which is opposite to that of the first bump layer 12 on the upper glass substrate 21, and implementing exposure, development to the corresponding negative transparent photoresist material or the corresponding positive transparent photoresist material with the same mask 7 to manufacture the second bump layer 22.

Figure 7A:
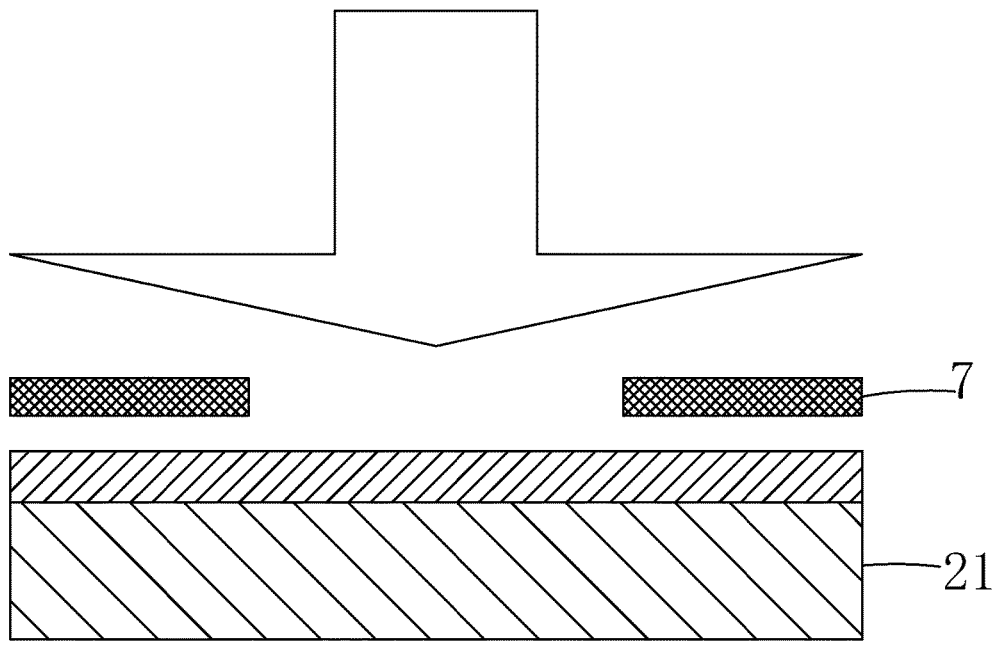
FIG. 7a is a diagram of exposure process in the step 22 of the manufacture method of the high transmittance VA type liquid crystal display panel according to the present invention.
Figure 7B:
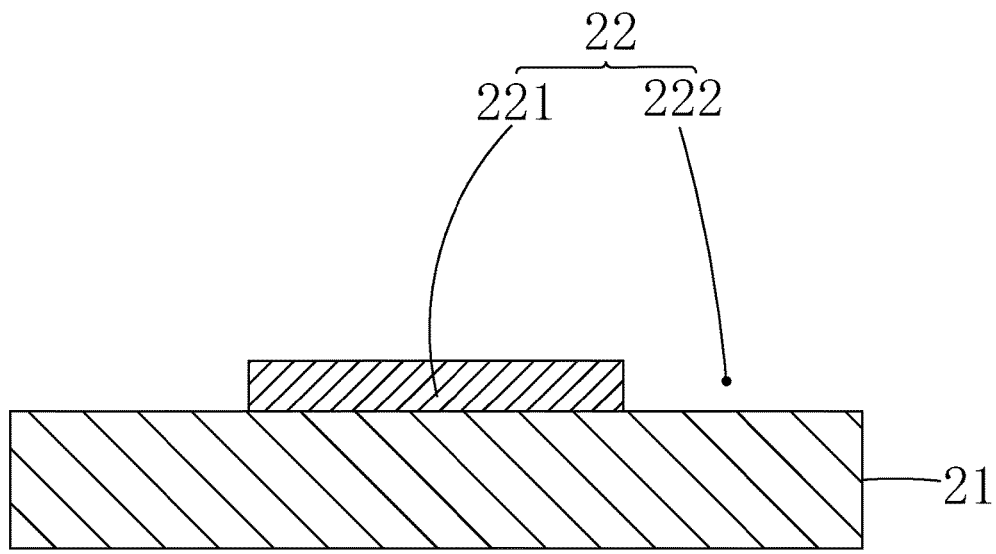
FIG. 7b is a diagram of development process in the step 22 of the manufacture method of the high transmittance VA type liquid crystal display panel according to the present invention.

Please refer to FIG. 7a and FIG. 7b. Coating the negative transparent photoresist material on the upper glass substrate 21 is illustrated. After exposure and development, the negative transparent photoresist material shielded by the mask 7 is removed to form the second concave part 222 of the second bump layer 22, and the second concave part 222 is coherent with a lower surface of the upper glass substrate 21; the negative transparent photoresist material not shielded by the mask 7 is preserved to form the second convex part 221 of the second bump layer 22.

The step 21 and the step 22 utilize the same mask 7 to manufacture the first bump layer 12 and the second bump layer 22. It is capable of making the first bump layer 12 and the second bump layer 22 effectively complement in structure and reduce the manufacture error.

step 3, respectively manufacturing a pixel electrode 13 on the first bump layer 12 to make the pixel electrode 13 continuously cover the first convex part 121 and first concave part 122 with a uniform thickness; manufacturing a common electrode 23 on the second bump layer 22 to make the common electrode 23 continuously cover the second convex part 221 and the second concave part 222 with a uniform thickness.

Specifically, both materials of the pixel electrode 13 and the common electrode 23 are ITO.

step 4, respectively manufacturing a first PI alignment layer 14 on the pixel electrode 13 to form a lower substrate 1, and manufacturing a second PI alignment layer 24 on the common electrode 23 to form an upper substrate 2.

step 5, oppositely assembling the upper substrate 2 and the lower substrate 1, and injecting liquid crystal between the upper substrate 2 and the lower substrate 1 to form a liquid crystal layer 4.

Thus, the manufacture of the high transmittance VA type liquid crystal display panel is accomplished. With the manufacture method to manufacture the VA type liquid crystal display panel, the cell gaps of the liquid crystal layers 4 in the different areas of the lower substrate 1 and the upper substrate 2 are basically consistent and the pixel electrode 13 continuously covers the first convex part 121 and first concave part 122 with a uniform thickness. No electrode areas corresponded with the slits of the pixel electrode pattern in prior art exist. The intensities of the electrical fields in the different areas of the lower substrate 1 and the upper substrate 2 are basically uniform. The issue of decreased transmittance due to the slits the pixel electrode pattern can be solved to raise the transmittance of the VA type liquid crystal display panel, and the demand of the VA type liquid crystal display panel to the backlight brightness can be decreased to reduce the cost and usage power consumption.

In conclusion, in the VA type liquid crystal display panel of the present invention, by respectively providing the first bump layer, the second bump layer, which complement in structure on the lower substrate and the upper glass substrate, and respectively providing the pixel electrode and the common electrode to continuously cover the first bump layer and the second bump layer with uniform thicknesses, and as the multi-domain display is realized, the cell gaps of the liquid crystal layers in the different areas of the lower substrate and the upper substrate are basically consistent and the intensity of the electrical fields is basically uniform. The issue of decreased transmittance due to the slits in the pixel electrode pattern can be solved to raise the transmittance of the VA type liquid crystal display panel, and the demand of the VA type liquid crystal display panel to the backlight brightness can be decreased to reduce the cost and usage power consumption. The manufacture method of the high transmittance VA type liquid crystal display panel according to the present invention utilizes the same mask to manufacture the first bump layer and the second bump layer to make the first bump layer and the second bump layer complement in structure. The transmittance of the VA type liquid crystal display panel made by the method is high and the demand of the VA type liquid crystal display panel to the backlight brightness can be decreased to reduce the cost and usage power consumption.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A high transmittance VA type liquid crystal display panel, comprising a lower substrate, an upper substrate oppositely located to the lower substrate and a liquid crystal layer located between the upper substrate and the lower substrate;

the lower substrate comprises a lower glass substrate, a first bump layer, a pixel electrode and a first PI alignment layer from bottom to top in sequence; the upper substrate comprises an upper glass substrate, a second bump layer, a common electrode and a second PI alignment layer from top to bottom in sequence;

the first bump layer comprises a first convex part and a first concave part which are mutually spaced, and the pixel electrode continuously covers the first convex part and first concave part with a uniform thickness; the second bump layer and the first bump layer complement in structure, and the second bump layer comprises a second convex part and a second concave part which are mutually spaced, and the common electrode continuously covers the second convex part and the second concave part with a uniform thickness; the second convex part is in accordance with the first concave part, and the second concave part is in accordance with the first convex part to make a cell gap of the liquid crystal layer in an area between the first convex part of the first bump layer and the second concave part of the second bump layer is consistent with a cell gap of the liquid crystal layer in an area between the first concave part of the first bump layer and the second convex part of the second bump layer to maintain an intensity of an electrical field between the upper substrate and the lower substrate uniform.

2. The high transmittance VA type liquid crystal display panel according to claim 1, wherein heights of the first convex part and the second concave part are equal, and heights of the first concave part and the second convex part are equal.

3. The high transmittance VA type liquid crystal display panel according to claim 2, wherein the first concave part is coherent with an upper surface of the lower glass substrate, and the second convex part is coherent with a lower surface of the upper glass substrate.

4. The high transmittance VA type liquid crystal display panel according to claim 3, wherein one of the first bump layer and the second bump layer is made by utilizing positive transparent photoresist material, and the other is made by utilizing negative transparent photoresist material.

5. The high transmittance VA type liquid crystal display panel according to claim 4, wherein the first bump layer and the second bump layer are made with the same mask.

6. The high transmittance VA type liquid crystal display panel according to claim 1, wherein both materials of the pixel electrode and the common electrode are ITO.

7. A high transmittance VA type liquid crystal display panel, comprising a lower substrate, an upper substrate oppositely located to the lower substrate and a liquid crystal layer located between the upper substrate and the lower substrate;
the lower substrate comprises a lower glass substrate, a first bump layer, a pixel electrode and a first PI alignment layer from bottom to top in sequence; the upper substrate comprises an upper glass substrate, a second bump layer, a common electrode and a second PI alignment layer from top to bottom in sequence;
the first bump layer comprises a first convex part and a first concave part which are mutually spaced, and the pixel electrode continuously covers the first convex part and first concave part with a uniform thickness; the second bump layer and the first bump layer complement in structure, and the second bump layer comprises a second convex part and a second concave part which are mutually spaced, and the common electrode continuously covers the second convex part and the second concave part with a uniform thickness; the second convex part is in accordance with the first concave part, and the second concave part is in accordance with the first convex part to make a cell gap of the liquid crystal layer in an area between the first convex part of the first bump layer and the second concave part of the second bump layer is consistent with a cell gap of the liquid crystal layer in an area between the first concave part of the first bump layer and the second convex part of the second bump layer to maintain an intensity of an electrical field between the upper substrate and the lower substrate uniform;
wherein heights of the first convex part and the second concave part are equal, and heights of the first concave part and the second convex part are equal;
wherein both materials of the pixel electrode and the common electrode are ITO.

8. The high transmittance VA type liquid crystal display panel according to claim 7, wherein the first concave part is coherent with an upper surface of the lower glass substrate, and the second convex part is coherent with a lower surface of the upper glass substrate.

9. The high transmittance VA type liquid crystal display panel according to claim 8, wherein one of the first bump layer and the second bump layer is made by utilizing positive transparent photoresist material, and the other is made by utilizing negative transparent photoresist material.

10. The high transmittance VA type liquid crystal display panel according to claim 9, wherein the first bump layer and the second bump layer are made with the same mask.

11. A manufacture method of a high transmittance VA type liquid crystal display panel, comprising steps of:
step 1, providing a lower glass substrate and an upper glass substrate;
step 2, respectively manufacturing a first bump layer on the lower glass substrate and a second bump layer on the upper glass substrate;
the first bump layer comprises a first convex part and a first concave part which are mutually spaced; the second bump layer and the first bump layer complement in structure, and the second bump layer comprises a second convex part and a second concave part which are mutually spaced; the second convex part is in accordance with the first concave part, and the second concave part is in accordance with the first convex part to make a cell gap of the liquid crystal layer in an area between the first convex part of the first bump layer and the second concave part of the second bump layer is consistent with a cell gap of the liquid crystal layer in an area between the first concave part of the first bump layer and the second convex part of the second bump layer to maintain an intensity of an electrical field between the upper substrate and the lower substrate uniform;
step 3, respectively manufacturing a pixel electrode on the first bump layer to make the pixel electrode continuously cover the first convex part and first concave part with a uniform thickness; manufacturing a common electrode on the second bump layer to make the common electrode continuously cover the second convex part and the second concave part with a uniform thickness;
step 4, respectively manufacturing a first PI alignment layer on the pixel electrode to form a lower substrate, and manufacturing a second PI alignment layer on the common electrode to form an upper substrate;
step 5, oppositely assembling the upper substrate and the lower substrate, and injecting liquid crystal between the upper substrate and the lower substrate to form a liquid crystal layer.

12. The manufacture method of the high transmittance VA type liquid crystal display panel according to claim 11, wherein the step 2 specifically comprises:
- step 21, coating positive transparent photoresist material or negative transparent photoresist material on the lower glass substrate, and implementing exposure, development to the positive transparent photoresist material or the negative transparent photoresist material with a mask to manufacture the first bump layer;
- step 22, coating the negative transparent photoresist material or the positive transparent photoresist material, which is opposite to that of the first bump layer on the upper glass substrate, and implementing exposure, development to the corresponding negative transparent photoresist material or the corresponding positive transparent photoresist material with the same mask to manufacture the second bump layer.

13. The manufacture method of the high transmittance VA type liquid crystal display panel according to claim 12, wherein in the step 2, the first concave part is coherent with an upper surface of the lower glass substrate, and the second convex part is coherent with a lower surface of the upper glass substrate.

14. The manufacture method of the high transmittance VA type liquid crystal display panel according to claim 12, wherein both materials of the pixel electrode and the common electrode are ITO.

\* \* \* \* \*